United States Patent Office 3,377,368
Patented Apr. 9, 1968

3,377,368
CASTOR OIL EXTRACTION PROCESS
Albert Gathman, Belmar, N.J., assignor to Esso Research and Engineering Company, a corporation of Delaware
No Drawing. Filed Sept. 29, 1965, Ser. No. 491,429
1 Claim. (Cl. 260—412.4)

ABSTRACT OF THE DISCLOSURE

The production of castor oil by solvent extraction is improved by use of a hydrocarbon solvent which essentially contains at least 99% isoparaffinic hydrocarbons including at least 85 wt. percent 2,2,4-trimethylpentane, which permits the use of a phase separation at temperatures in the range of 60° F. to 80° F. in obtaining a solvent layer of lower oil content and an oil layer of lower solvent content in comparison to naphtha fractions or normal paraffins containing 6, 7, 8, or 9 carbon atoms per molecule or mixtures thereof.

---

This invention is directed to an improvement in the extraction of castor oil from crushed or comminuted castor beans with a hydrocarbon solvent found to be particularly effective at elevated temperatures.

The hydrocarbon solvent now found particularly suitable as a castor oil solvent for extraction at temperatures that are higher than those conventionally used is characterized by its high content of the component 2,2,4-trimethylpentane with nearly complete absence of cycloparaffins or naphthenes, aromatics, and olefins. It is also clearly distinguishable from ordinary technical or commercial grades of hydrocarbon solvents which have hitherto been recommended as most effective including the solvent known as commercial "heptane."

The commercial grades of paraffinic hydrocarbon solvents generally contain substantial amounts of cycloparaffins and much more than trace amounts of aromatics. Hitherto the use of paraffinic type solvents of the known "octane" grade or higher boiling was found unsuitable on account of difficulties in separating a solvent-rich solution from an oil-rich solution and of removing the solvent from the castor oil. Use of the lower boiling grades of hydrocarbon solvents including "heptane" was found to preclude extraction temperatures higher than about 104° F. and to require a substantial amount of refrigeration for cooling the solutions far below ambient temperatures in order to obtain a separation of the solvent from the extracted castor oil.

Procedures for processing castor oil beans involving a solvent extraction are well known in the prior art as represented by the procedure described in U.S. Patent 2,616,907.

Theoretically the critically selected hydrocarbon solvent used in accordance with the present invention may be obtained by a hydrogenation of 2,4,4-trimethylpentene-1 which is a dimer of isobutene, but in the dimerization of isobutene, various other compounds are formed including 2,4,4-trimethylpentene-2 and there are difficulties in separating such close boiling isomers as are formed. However, it has been found possible to prepare uniformly a high-purity $C_8$ alkylate composition containing above 85% by weight of 2,2,4-trimethylpentane by the alkylation reaction of isobutane with isobutene in the presence of concentrated sulfuric acid, preferably sulfuric acid containing 96 to 100% $H_2SO_4$. The resulting alkylate product is given a close fractionation to obtain a fraction boiling in the range of 208° F. to 217° F., and this fraction is then properly purified by being subjected to hydrofining at temperatures of 550° F. to 580° F. in the presence of hydrogen and the catalyst, e.g., cobalt molybdate supported on alumina, after which the hydrocarbon fraction is washed with caustic solution and then contacted with an absorbent that is capable of absorbing moisture, sulfur-containing impurities, and a number of organic impurities which tend to impart odor and color. The method of alkylation and the method of purification as shown to be used on heavy alkylate in U.S. Patent 3,121,678 may be employed for treating the presently prescribed lower boiling alkylate which principally contains 2,2,4-trimethylpentane and boils in the range of 208° F. to 217° F.

The preferred alkylate of high purity found to be useful for the purpose of the present invention to accomplish relatively high temperature extraction of castor oil has properties as the following inspection characteristics.

TABLE I.—HIGH-PURITY $C_8$ ALKYLATE

Solvency:
    Kauri-butanol value _____ 27
    Aniline point _____ 173° F.(78° C.)
Composition, wt., percent:
    $C_6$ paraffins _____ 00.5
    $C_7$ paraffins _____ 7.6
    $C_8$ isoparaffins [1] _____ 91.8
    Total paraffins [2] _____ 99.9
    Aromatics _____ 0.1
    Olefins _____ 0.1
    Average molecular weight _____ 113
Volatility: Distillation, ° F.—
    Initial boiling point _____ 208(98° C.)
    50% _____ 211(99° C.)
    Dry point _____ 217(103° C.)
General:
    Sulfur, 7 p.p.m.
    Color, Saybolt _____ +30
    Specific gravity, 60/60° F. _____ 0.696

[1] Typically 87+% 2,2,4-trimethylpentane.
[2] Above 99% isoparaffins.

The procedure for the extraction of castor oil from the crushed castor beans involves contacting the crushed or ground beans with the extracting solvent in a proportion and at a temperature to obtain a solution of the extracted oil in the solvent, then separating the resulting solution of the castor oil in the solvent from the bean particle solids, cooling the separated solution to a temperature at which it separates into two layers, e.g., 60° F. to 80° F. such that an upper or lighter solvent layer containing a relatively small amount of the oil and a lower or heavier layer of the castor oil containing a relatively small amount of the solvent, separating said layers and recovering the castor oil from the lower layer; the upper layer, which contains a small amount of the castor oil in the solvent, may then be recycled for use in extracting another batch of comminuted castor beans.

In the experimental work which was conducted to demonstrate the invention, the high purity $C_8$ alkylate solvent described was used to form the homogeneous solution which could contain up to 10 wt. percent oil at 152° F. and up to 15 wt. percent of the castor oil at 157° F. These high temperatures of complete miscibility of about 50% higher than the temperatures at which phase separation takes place in using a technical grade of heptane having slightly lower boiling ranges, i.e., 201° F. to 210° F.

On cooling the solutions of the castor oil in the solvent, it was found that at about room temperature (77° F.) the amount of oil remaining in the upper solvent layer was relatively low and the amount of solvent in the oil layer at the same temperature was relatively low compared to the distribution obtained in using a commercial grade "heptane." The following table shows the data:

TABLE II.—DISTRIBUTION

|  | Heptane | High Purity $C_8$ Alkylate |
|---|---|---|
| Wt. percent oil in solvent layer at 77° F | 5.0 | 2.2 |
| Wt. percent solvent in oil layer at 77° F | 43.6 | 24.1 |

After separating the two layers, i.e., the solvent layer from the oil layer, the solvent is stripped from the oil layer by evaporation which has been found to take place substantially as rapidly as the evaporation of the heptane grade of solvent. Upon evaporating the solvent from the oil layer, the residual castor oil is thus recovered.

There are a number of additional advantages indicated to arise from the use of the high purity $C_8$ alkylate with regard to the castor bean meal by-product in addition to the advantages obtained in the procedure. By using a higher temperature extraction, i.e., of the order of 150° F. to about 160° F., more of the toxic substances in the bean meal are destroyed so as to make it safer for its ordinary uses, such as fertilizer.

An important advantage in using the higher temperature extraction and higher temperature phase separation is in the faster extraction and saving in refrigeration during the cooling of the solution to obtain the phase separation. Since the separated solvent-rich layer contains such a small amount of castor oil, it can be stored or recycled without need for addition of much heat.

In the usual manner, the bean solids after the extraction and the separation from the solution by filtering may be steamed to recover solvent and then dried.

The described invention may have modifications in the procedures for obtaining the specified solvent, the use of said solvent in extracting the castor oil and in the recovery of both solvent and castor oil.

What is claimed is:
1. In the production of castor oil by solvent extraction of castor oil from comminuted castor beans, the improvement which comprises contacting the comminuted castor beans with a hydrocarbon solvent which essentially contains at least 99% isoparaffinic hydrocarbons including at least 85 wt. percent 2,2,4-trimethylpentane and which boils in the range of 208° F. to 217° F., forming a solution of the castor oil in said solvent at temperatures in the range of 150° F. to 160° F., separating said solution from the castor oil bean particles from which castor oil is extracted, then cooling said solution to a temperature in the range of 60° F. to 80° F. at which two layers are formed, a lighter layer and a heavier layer, said lighter layer containing a small amount of castor oil in the solvent and the heavier layer containing a relatively small amount of solvent in castor oil and recovering castor oil from said heavier layer.

References Cited

UNITED STATES PATENTS 2,616,908  11/1952  Colbeth et al. _____ 260—412.4

ALEX MAZEL, *Primary Examiner.*

HENRY R. JILES, *Examiner.*

R. BOYD, A. M. TIGHE, *Assistant Examiners.*